United States Patent
Wang

(10) Patent No.: US 11,062,428 B2
(45) Date of Patent: Jul. 13, 2021

(54) IMAGE ENHANCING METHOD, DEVICE, APPARATUS AND STORAGE MEDIUM

(71) Applicant: Weifang University, Weifang (CN)

(72) Inventor: Wencheng Wang, Weifang (CN)

(73) Assignee: Weifang University, Weifang (CN)

(*) Notice: Subject to any disclaimer, the term of this patent is extended or adjusted under 35 U.S.C. 154(b) by 109 days.

(21) Appl. No.: 16/535,894

(22) Filed: Aug. 8, 2019

(65) Prior Publication Data

US 2021/0004936 A1 Jan. 7, 2021

(30) Foreign Application Priority Data

Jul. 4, 2019 (CN) .......................... 201910597613.0

(51) Int. Cl.
*G06T 5/00* (2006.01)
*G06T 7/90* (2017.01)
*G06T 3/40* (2006.01)

(52) U.S. Cl.
CPC ............ *G06T 5/001* (2013.01); *G06T 3/4015* (2013.01); *G06T 5/009* (2013.01); *G06T 7/90* (2017.01)

(58) Field of Classification Search
CPC ......... G06T 5/001; G06T 7/90; G06T 3/4015; G06T 5/009; H04N 9/646; H04N 9/77
USPC ...................................................... 382/254
See application file for complete search history.

(56) References Cited

U.S. PATENT DOCUMENTS

| | | | | |
|---|---|---|---|---|
| 4,819,061 A | * | 4/1989 | Lang | H04N 9/78 348/666 |
| 5,159,440 A | * | 10/1992 | Hong | H04N 9/893 348/512 |
| 2008/0008382 A1 | * | 1/2008 | Matsushima | G06T 5/009 382/167 |
| 2008/0284878 A1 | * | 11/2008 | Kosakai | G06T 5/40 348/241 |
| 2014/0146318 A1 | * | 5/2014 | Hu | H05B 45/22 356/405 |
| 2015/0043655 A1 | * | 2/2015 | Nilsson | H04N 5/91 375/240.26 |
| 2017/0154412 A1 | * | 6/2017 | Tatsumi | H04N 5/23293 |
| 2018/0286025 A1 | * | 10/2018 | Wang | G06T 5/40 |

* cited by examiner

*Primary Examiner* — Ali Bayat
(74) *Attorney, Agent, or Firm* — Bay State IP, LLC

(57) ABSTRACT

The present invention relates to an image enhancing method, a device, an apparatus and a storage medium. In the image enhancing method, first, the luminance component and the chrominance component of the image are separated and extracted, and then the ambient illumination information in the luminance component is extracted to obtain the illumination component. The luminance image is subjected to luminance correction using the illumination component to obtain the corrected luminance component, and the enhanced image is obtained by combining the chrominance component. Because the whole adjusting process adjusts the luminance of the image based on the ambient luminance information carried by the image itself, the luminance of the image can be adaptively adjusted, a weak light region is strengthened, a hard light region is weakened, the illumination balance is achieved, the enhancement effect is better, and the color distortion of the image is extremely small.

8 Claims, 3 Drawing Sheets

IMAGE ENHANCING METHOD, DEVICE, APPARATUS AND STORAGE MEDIUM

CROSS REFERENCE TO RELATED APPLICATION

This application claims priority to and takes the benefit of Chinese Patent Application No. 201910597613.0 filed on Jul. 4, 2019, the contents of which are herein incorporated by reference.

TECHNICAL FIELD

The present invention relates to the field of image processing technologies, and in particular, to an image enhancing method, a device, an apparatus, and a storage medium.

BACKGROUND

Digital image processing systems have been widely used in industrial production, video surveillance, intelligent transportation, remote sensing monitoring and other fields, and play an important role in it. The actual image acquiring process is always affected by various factors, resulting in various defects in the obtained image. Especially when the light conditions are poor, because the light reflected by the target to be acquired is weak or uneven, the obtained image has a distorted color and contains a lot of noise, which seriously affects the overall quality of the image, not only affects the visual experience of the human eye, but also affects the accuracy of subsequent processes such as image segmentation and target recognition.

In order to eliminate these adverse effects as much as possible, various image enhancing methods have been proposed in the related art, but most of these methods process the image as a whole. The processing effect on the overall dark or overall luminous image is acceptable, but the processing effect on the image in the area which is dark and luminous simultaneously is not very good. It is particularly easy to enhance the dark area while excessively enhancing the luminous area, or there is the problem that the noise is amplified, and the adaptability is poor.

SUMMARY

In view of this, the object of the present invention is to overcome the deficiencies of the prior art, and to provide an image enhancing method, a device, an apparatus, and a storage medium, which perform adaptive processing on local regions of an image, respectively, to optimize the processing effect of image enhancement.

To achieve the above object, the present invention adopts the following technical solutions:

An image enhancing method, comprising:
acquiring an image to be enhanced;
separating and extracting a luminance component and a chrominance component of the image to be enhanced;
extracting an illumination component from the luminance component;
performing luminance correction on the luminance component according to the illumination component to obtain a corrected luminance component;
synthesizing the corrected luminance component with the chrominance component to obtain an enhanced image.

Preferably, separating and extracting the luminance component and the chrominance component of the image to be enhanced comprises:
determining whether the image to be enhanced belongs to a first target color space; wherein the first target color space is a color space comprising luminance;
if so, directly extracting the luminance component and the chrominance component of the image to be enhanced;
if not, converting the image to be enhanced into an image based on the first target color space and extracting the luminance component and the chrominance component.

Preferably, synthesizing the corrected luminance component with the chrominance component to obtain an enhanced image further comprises:
performing grayscale stretching on the corrected luminance component.

Preferably, the first target color space comprises: a YUV color space.

Preferably, extracting the illumination component from the luminance component comprises:
extracting the illumination component from the luminance component according to the following formula:

$$I(x,y) = Y(x,y) * G(x,y)$$

where $Y(x,y)$ is the luminance component, $G(x,y)$ is a filter function, and $I(x,y)$ is the illumination component.

Preferably, performing luminance correction on the luminance component according to the illumination component to obtain a corrected luminance component comprises:
performing luminance correction on the luminance component according to the illumination component according to the following formula to obtain a corrected luminance component:

$$Y'(x, y) = Y(x, y)^{f_2[I(x,y)]f_1[I(x,y)]}$$

where $f_1[I(x,y)]$ and $f_2[I(x,y)]$ are functions of the illumination component $I(x,y)$, and, $Y'(x,y)$ is the corrected luminance component.

Preferably, performing grayscale stretching on the corrected luminance component comprises:
performing grayscale stretching on the corrected luminance component according to the following formula:

$$Y''(x, y) = \frac{1-A}{B-A} Y'(x, y) + \frac{(B-1)A}{B-A}$$

where A is the minimum gray level of the corrected luminance component $Y'(x,y)$, B is the maximum gray level of the corrected luminance component $Y'(x,y)$, and $Y''(x,y)$ is the corrected luminance component after performing the grayscale stretching.

An image enhancing device, comprising:
an image acquiring module configured to acquire an image to be enhanced;
a separating module configured to separate and extract a luminance component and a chrominance component of the image to be enhanced;
an extracting module configured to extract an illumination component from the luminance component;
a luminance correcting module configured to perform luminance correction on the luminance component according to the illumination component to obtain a corrected luminance component;
an image recovering module configured to synthesize the corrected luminance component with the chrominance component to obtain an enhanced image.

An image enhancing apparatus, comprising:
a processor and a memory connected to the processor;
wherein the memory is configured to store a computer program;
the processor is configured to invoke and execute the computer program in the memory to perform the steps of the method as described above.

A storage medium, wherein a computer program is stored in the storage medium, which, when executed by a processor, implements the steps of the method as described above.

The technical solutions provided by the present application may comprise the following beneficial effects.

The present application provides an image enhancing method. During processing, first, the luminance component and the chrominance component of the image are separated and extracted, and then the ambient illumination information in the luminance component is extracted to obtain the illumination component. The luminance image is subjected to luminance correction using the illumination component to obtain the corrected luminance component, and the enhanced image is obtained by combining the chrominance component. The illumination component reflects the ambient luminance information. Since the ambient luminance is different at different positions, correspondingly, the luminance of the obtained image is different at different positions. In addition, because the whole luminance adjusting process adjusts the luminance of the image based on the ambient luminance information carried by the image itself, the luminance adjustment of the image at each position is adapted to the ambient luminance, so that the luminance of the image can be adaptively adjusted, a weak light region is strengthened, a hard light region is weakened, the illumination balance is achieved, the enhancement effect is better, and the color distortion of the image is extremely small.

BRIEF DESCRIPTION OF THE DRAWINGS

In order to more clearly illustrate the technical solutions in the embodiments of the present invention or the prior art, the drawings used in the description of the embodiments or the prior art will be briefly described below. Obviously, the drawings in the following description are merely some embodiments of the present invention, and other drawings can be obtained from those skilled in the art without any creative work.

DESCRIPTION OF THE EMBODIMENTS

In order to make the objects, technical solutions and advantages of the present invention more clear, the technical solutions of the present invention will be described in detail below. It is apparent that the described embodiments are merely some embodiments of the present invention, rather than all of the embodiments. All other embodiments obtained by those skilled in the art based on the embodiments of the present invention without any creative work fall within the scope of protection of the present invention.

Figure 1:
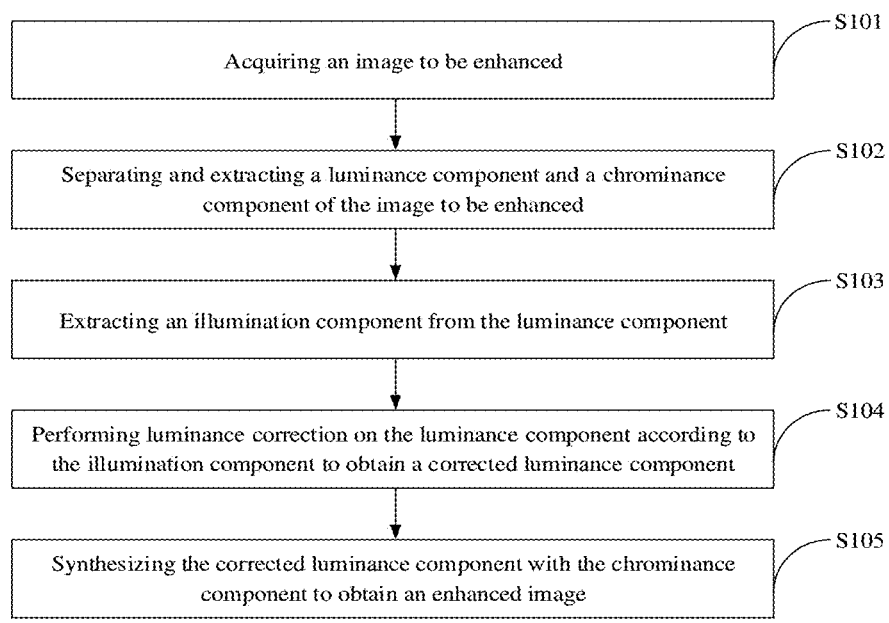
FIG. 1 is a flowchart of an image enhancing method according to an embodiment of the present invention.

Referring to FIG. 1, FIG. 1 is a flowchart of an image enhancing method according to an embodiment of the present invention.

As shown in FIG. 1, the image enhancing method according to this embodiment may specifically comprise the following steps:

S101, acquiring an image to be enhanced;

S102, separating and extracting a luminance component and a chrominance component of the image to be enhanced;

wherein the luminance of the image to be enhanced is not uniform, there is an area that is too bright or too dark, the luminance should be adjusted without affecting the color of the image, and it is necessary to separate the luminance and color information and adjust the luminance separately, S103, extracting an illumination component from the luminance component;

The luminance component of the luminance information reflecting the image is a two-dimensional array or a two-dimensional function, which is visually a grayscale image. The function value corresponding to each coordinate is the luminance value of each pixel point on the image. According to the illumination-reflection model, the luminance of an image acquired under illumination can be expressed by the product of the illumination component incident on the surface of the object and the reflection component reflected by the surface of the object. In the frequency domain, the spectrum of the illumination component is mainly concentrated in the low frequency band, reflecting the illumination of the imaging environment. The spectrum of the reflection component is mainly concentrated in the high frequency band, reflecting the detailed features of the object. In the visual sense, when the ambient light is strong, the luminance of the captured image is relatively high. Conversely, when the ambient light is weak, the luminance of the captured image is relatively low. Therefore, the illumination component can be extracted by filtering the low frequency portion of the luminance image.

S104, Luminance correction is performed on the luminance component according to the illumination component to obtain a corrected luminance component.

S105, The corrected luminance component is synthesized with the chrominance component to obtain an enhanced image.

During processing, first, the luminance component and the chrominance component of the image are separated and extracted, and then the ambient illumination information in the luminance component is extracted to obtain the illumination component. The luminance image is subjected to luminance correction using the illumination component to obtain the corrected luminance component, and the enhanced image is obtained by combining the chrominance component. The illumination component reflects the ambient luminance information. Since the ambient luminance is different at different positions, correspondingly, the luminance of the obtained image is different at different positions. In addition, because the whole luminance adjusting process adjusts the luminance of the image based on the ambient luminance information carried by the image itself, the luminance adjustment of the image at each position is adapted to the ambient luminance, so that the luminance of the image can be adaptively adjusted, a weak light region is strengthened, a hard light region is weakened, the illumination balance is achieved, the enhancement effect is better, and the color distortion of the image is extremely small.

In some embodiments, the luminance component and the chrominance component of the image to be enhanced are extracted. The specific embodiment may comprise: determining whether the image to be enhanced belongs to the first target color space; wherein the first target color space is a color space comprising the luminance; if so, directly extracting the luminance component and the chrominance component of the image to be enhanced; if not, converting the image to be enhanced into an image based on the first target color space and extracting the luminance component and the chrominance component.

The color space, also known as the color model (also known as a color space or a color system), is used to illustrate color in generally acceptable manners under certain standards. In essence, the color model is an illustration of the coordinate system and subspace. Each color located in the system is represented by a single point. Hundreds of color spaces have been proposed so far. The color objects described are objective themselves, and different color spaces are only measured from different angles.

The color space can be divided into two categories according to the basic structure. One category is to describe the primary color space of the color object with several basic colors as components, such as RGB color space; the other category is to describe the color space, in which color and luminance are separated, of the color object with the color and luminance as components, such as the YUV color space.

The first target color space is a color space comprising luminance, that is, the color space belonging to the type in which color and luminance are separated. Preferably, the first target color space comprises: a YUV color space.

If the image to be enhanced belongs to the color space in which color and luminance are separated, the required luminance component is already included in the component, and the luminance component and the chrominance component can be directly extracted; if the image to be enhanced belongs to the primary color space, then the required luminance component is not included in the component. The image needs to be first converted into an image of the color space in which color and luminance are separated, and then the luminance component and the chrominance component are extracted. According to actual needs, preferably, after the enhanced image is obtained, the image can be converted into the second target color space. The second target color space is a color space different from the first target color space.

For example, the image to be enhanced belongs to the YUV color space, because the luminance signal Y and the chrominance signals U, V in the YUV color space are separated, so that the luminance component and the chrominance component can be directly extracted. However, if the image to be enhanced belongs to the RGB color space, since only there are only components representing the red, green, and blue color information, respectively, in the RGB color space, the image may be first converted into the YUV color space, and then the luminance component and the chrominance component are extracted. After being enhanced, the image can be converted back to the RGB color space or other color spaces.

The formula in which the image to be enhanced is converted from the RGB color space to the YUV color space is as follows:

$$\begin{cases} Y = 0.299R + 0.587G + 0.114B \\ U = -0.147R - 0.289G + 0.436B \\ V = 0.615R - 0.515G - 0.100B \end{cases} \quad (1)$$

where R, G, and B are components representing the red, green, and blue color information, respectively, in the RGB color space, Y, U, and V are components representing the luminance signal and the chrominance signal in the YUV color space, and Y is the luminance component Y(x,y) involved in the image enhancing method provided by the embodiment.

Correspondingly, the formula in which the enhanced image is converted from the YUV color space back to the RGB color space is as follows:

$$\begin{cases} R' = 1.000Y' + 0.000U + 1.140V \\ G' = 1.000Y' - 0.395U - 0.581V \\ B' = 1.000Y' + 2.032U + 0.001V \end{cases} \quad (2)$$

where R', G', and B' are the enhanced red, green and blue color components, and Y' is the enhanced luminance component Y'(x,y).

Some embodiments also provide another way to convert the enhanced image from the YUV color space back to the RGB color space. The corresponding formula is as follows:

$$\begin{cases} R' = \xi \times [(Y'/Y) \times (R+Y) + R - Y] \\ G' = \xi \times [(Y'/Y) \times (G+Y) + G - Y] \\ B' = \xi \times [(Y'/Y) \times (B+Y) + B - Y] \end{cases} \quad (3)$$

where $\xi$ is a constant. In the experiment, it is found through many times of verification that when $\xi$ has a value of 0.5, the color saturation of the obtained image is closest to the original image.

The RGB color space is a commonly used color space. Therefore, the above embodiment is described by taking the conversion of the RGB color space as an example. Other color space converting methods can refer to the above embodiment. Those skilled in the art can derive the specific conversion formula, which will not be listed herein.

Preferably, the illumination component is extracted from the luminance component, comprising:

extracting the illumination component from the luminance component according to the following formula:

$$I(x,y) = Y(x,y) * G(x,y) \quad (4)$$

where Y(x,y) is the luminance component, G(x,y) is a filter function, and I(x,y) is the illumination component.

The filter can select a guiding filter, and the Gaussian filtering and bilateral filtering can also extract the illumination component better. Relatively speaking, the guiding filtering can achieve a better filtering effect.

The luminance unevenness of the image to be enhanced is mainly caused by the difference of the illumination components of each part in the image. The luminance of the part is adjusted by using the illumination component of each part as a parameter. If the illumination luminance of the part is lower than the standard value, the luminance value of this part is correspondingly increased. Correspondingly, if the illumination luminance of the part is higher than the standard value, the luminance value of this part is correspondingly lowered. In the actual digital image processing process, the adjustment is performed in units of pixels. Correspondingly, each value in the two-dimensional array of the luminance component may change, and finally the corrected luminance component is obtained. In this way, the image can be adaptively adjusted, which is more detailed and precise than the overall adjustment in the related art.

In order to achieve a better filtering effect, the window size of the filter can be changed. After experimental analysis, when the window size of the guiding filter is selected to be ¼ of the minimum size of the image, the obtained filtering effect is relatively better; in addition, a better light component can also be obtained with the method of weighting the average of the filtering results of a plurality of filters of different sizes.

Correspondingly, the calculation formula of the window size of the filter is as follows:

$$c = \text{Int}\left[\frac{\min(w, h)}{4}\right] \quad (5)$$

where c is the size of the window of the filter, w is the pixel value of the width dimension of the image to be processed, and h is the pixel value of the height dimension of the image to be processed.

The formula in which the illumination component is obtained with the method of weighting the average of the filtering results of a plurality of filters of different sizes is as follows:

$$I(x, y) = \sum_{i=1}^{n} \omega_i [Y(x, y) * G_i(x, y)] \quad (6)$$

where I(x,y) is the illumination component, $\omega_i$ is the weighted value of the illumination component corresponding to the i-th filter, Y(x,y) is the luminance component, and $G_i(x,y)$ is the filter function of the i-th filter.

Preferably, performing luminance correction on the luminance component according to the illumination component to obtain a corrected luminance component comprises:

performing luminance correction on the luminance component according to the illumination component according to the following formula to obtain a corrected luminance component:

$$Y'(x, y) = Y(x, y)^{f_2[I(x,y)]f_1[I(x,y)]} \quad (7)$$

where $f_1[I(x,y)]$ and $f_2[I(x,y)]$ are functions of the illumination component I(x,y), and, Y'(x,y) is the corrected luminance component.

Figure 2:
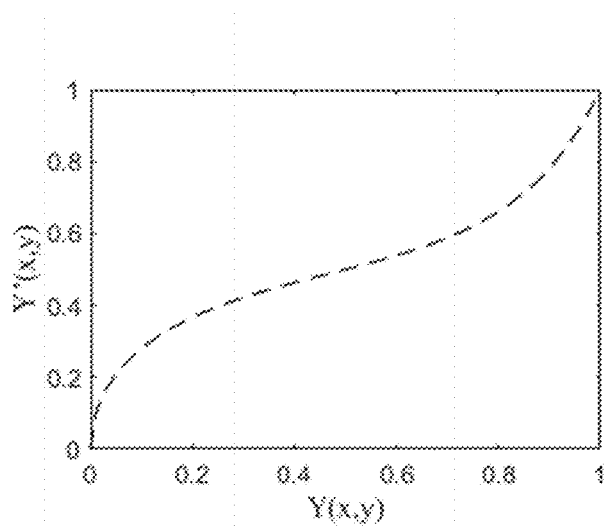
FIG. 2 is a graph illustrating a function relationship between a corrected luminance component and a luminance component according to an embodiment of the present invention.

$f_1[I(x,y)]$ has a value of 2*I(x,y)−1; $f_2[I(x,y)]$ has a value of 2+I(x,y). Refer to FIG. 2 for a corresponding correction relationship. FIG. 2 is a graph illustrating a function relationship between a corrected luminance component and a luminance component of an image to be enhanced according to an embodiment of the present invention. In the present embodiment, the value of the image luminance information is adjusted to be within the range of [0, 1], and it is considered that 0.5 is a standard value of luminance, indicating that the luminance is appropriate.

As shown in FIG. 2, the value Y(x,y) is indicated by the horizontal axis and the value Y'(x,y) is indicated by the vertical axis. In the case where no correction is performed, the value Y(x,y) is equal to the value Y'(x,y). After the correction, when the value Y(x,y) is greater than 0 and less than 0.5, that is, when the image is dark at the point (x,y), the correspondingly corrected value Y'(x,y) is significantly increased, that is, the luminance of the image at the point is significantly improved; similarly, when the value Y(x,y) is greater than 0.5 and less than 1, that is, when the image is brighter at the point (x,y), the correspondingly corrected value Y'(x,y) is significantly reduced, that is, the luminance of the image at the point is significantly reduced, the overall luminance of the image tends to be balanced, and the desired local enhancing effect is achieved.

Preferably, before the corrected luminance component and the chrominance component are synthesized to obtain an enhanced image, the image enhancing method provided by some embodiments may further comprise performing grayscale stretching on the corrected luminance component.

The process of correcting the luminance component is equivalent to the process of increasing the luminance value that is too low and reducing the luminance value that is too high. The luminance level or the gray level of the corrected luminance component is more concentrated in the interval close to the standard value. By grayscale stretching, the dynamic range of the grayscale value can be appropriately enlarged, and the detail information in the image is more prominent.

Preferably, performing grayscale stretching on the corrected luminance component comprises:

performing grayscale stretching on the corrected luminance component according to the following formula:

$$Y''(x, y) = \frac{1-A}{B-A} Y'(x, y) + \frac{(B-1)A}{B-A}$$

where A is the minimum gray level of the corrected luminance component Y'(x,y), B is the maximum gray level of the corrected luminance component Y'(x,y), and Y''(x,y) is the corrected luminance component after performing the grayscale stretching. With this formula, the gray level of the image, that is, the luminance range, can be extended from [A, B] to [A, 1], and the degree of discrimination of luminance in the image is increased to make the details in the image clearer.

Figure 3A:
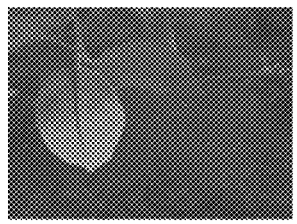
FIG. 3a is an image prior to grayscale stretching according to an embodiment of the present invention.
Figure 3B:
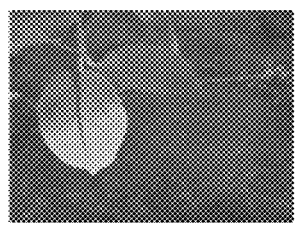
FIG. 3b is an image subsequent to grayscale stretching according to an embodiment of the present invention.

Referring to FIG. 3a and FIG. 3b, FIG. 3a is an image prior to grayscale stretching according to an embodiment of the present invention, and FIG. 3b is an image subsequent to grayscale stretching according to an embodiment of the present invention. As shown in FIG. 3a and FIG. 3b, it can be clearly seen through comparison that the image subsequent to grayscale stretching has a clearer light and darkness, and the detailed information in the image is clearer with a better enhancement effect.

The image enhancing method provided by the present application is described in more detail below by taking a specific application scenario as an example.

Figure 4:
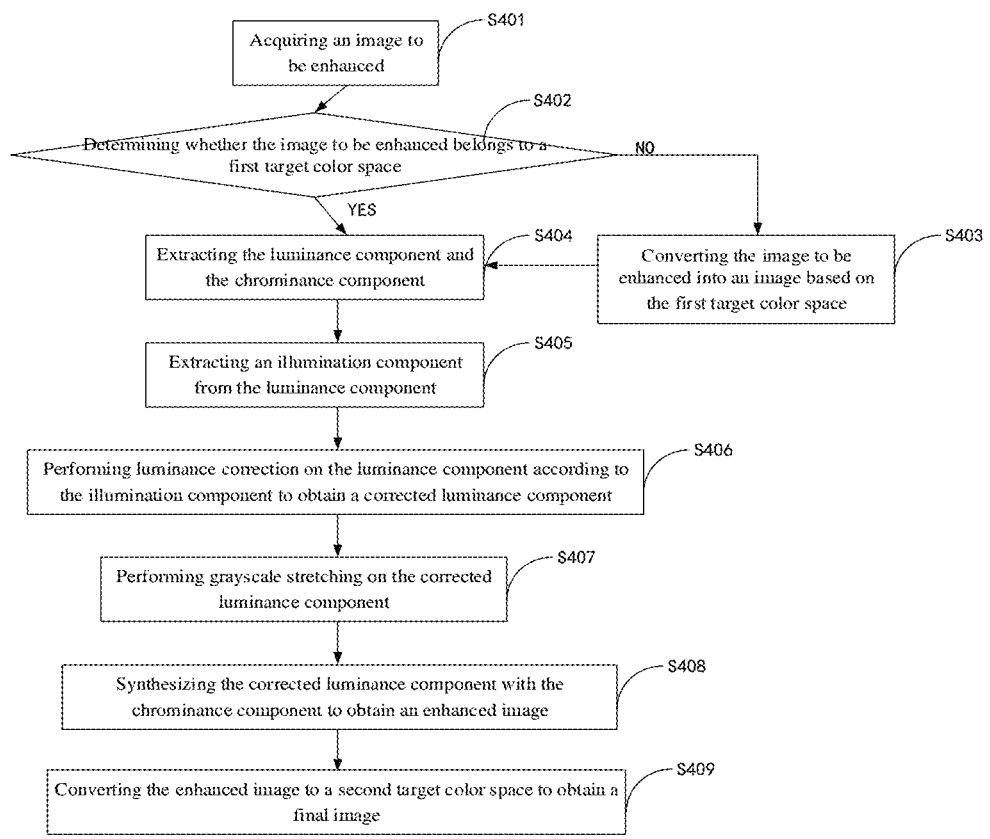
FIG. 4 is a flowchart of another image enhancing method according to an embodiment of the present invention.

Referring to FIG. 4, FIG. 4 is a flowchart of another image enhancing method according to an embodiment of the present invention. As shown in FIG. 4, the image enhancing method according to this embodiment may specifically comprise the following steps:

S401, acquiring an image to be enhanced, and executing step S402;

S402, determining whether the image to be enhanced belongs to a first target color space; wherein the first target color space is a color space comprising luminance; if so, executing step S404; otherwise, executing step S403;

wherein in this step, the first target color space may be a YUV color space;

S403, converting the image to be enhanced into an image based on the first target color space, and executing step S404;

S404, extracting the luminance component and the chrominance component, and executing step S405;

S405, extracting an illumination component from the luminance component, and executing step S406;

S406, performing luminance correction on the luminance component according to the illumination component to obtain a corrected luminance component, and executing step S407;

S407, performing grayscale stretching on the corrected luminance component, and executing step S408;

S408, synthesizing the corrected luminance component with the chrominance component to obtain an enhanced image, and executing step S409;

S409, converting the enhanced image to a second target color space to obtain a final image.

The second target color space is a color space different from the first target color space, which in this embodiment is a color space other than the YUV color space.

For the specific embodiments and technical effects of the present embodiment, refer to any of the above embodiments, which will not be described in detail herein.

Figure 5:
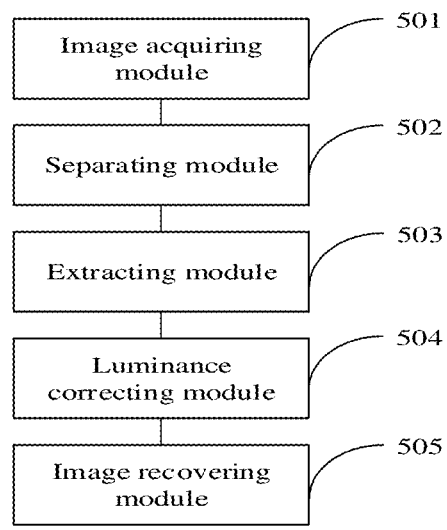
FIG. 5 is a schematic diagram illustrating a structure of an image enhancing device according to an embodiment of the present invention.

Refer to FIG. 5, which is a schematic diagram illustrating a structure of an image enhancing device according to an embodiment of the present invention. As shown in FIG. 5, the image enhancing device according to this embodiment may specifically comprise:

an image acquiring module 501 configured to acquire an image to be enhanced;

a separating module 502 configured to separate and extract a luminance component and a chrominance component of the image to be enhanced;

an extracting module 503 configured to extract an illumination component from the luminance component;

a luminance correcting module 504 configured to perform luminance correction on the luminance component according to the illumination component to obtain a corrected luminance component;

an image recovering module 505 configured to synthesize the corrected luminance component with the chrominance component to obtain an enhanced image.

Preferably, the separating module 502 is specifically configured to determine whether the image to be enhanced belongs to a first target color space; wherein the first target color space is a color space comprising luminance;

if so, directly extract the luminance component and the chrominance component of the image to be enhanced;

if not, convert the image to be enhanced into an image based on the first target color space and extract the luminance component and the chrominance component.

Preferably, the above device further comprises a grayscale stretching module configured to perform grayscale stretching on the corrected luminance component.

For the specific embodiments and technical effects of the present embodiment, refer to any of the above embodiments, which will not be described in detail herein.

Figure 6:
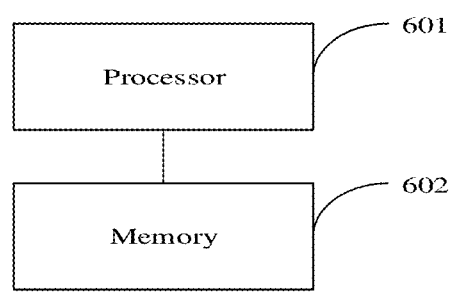
FIG. 6 is a schematic structural diagram of an image enhancing apparatus according to an embodiment of the present invention.

Refer to FIG. 6, which is a schematic structural diagram of an image enhancing apparatus according to an embodiment of the present invention.

As shown in FIG. 6, the image enhancing apparatus according to this embodiment comprises:

a processor 601 and a memory 602 connected to the processor;

wherein the memory 602 is configured to store a computer program;

the processor 601 is configured to invoke and execute the computer program in the memory 602 to perform the steps of the method of any of the above embodiments.

For the specific embodiments and technical effects of the present embodiment, refer to any of the above embodiments, which will not be described in detail herein.

Another embodiment of the present application further provides a storage medium in which a computer program is stored, which, when executed by a processor, implements the steps of the method of any of the above embodiments.

Refer to any of the above embodiments for the embodiments of each step, and the same beneficial effects are generated, which will not be described in detail herein.

It is to be understood that the same or similar parts in the above embodiments may be referred to each other, and those not described in detail in some embodiments may refer to the same or similar contents in other embodiments.

It should be noted that in the description of the present invention, the terms "first", "second" and the like are used for descriptive purposes only, and are not to be construed as indicating or implying relative importance. Further, in the description of the present invention, the meaning of "a plurality of" means at least two unless otherwise stated.

Any process or method description in the flowcharts or otherwise described herein may be understood to represent a module, a segment or a portion of a code that includes one or more executable instructions for implementing the steps of a particular logical function or process, and the scope of the preferred embodiments of the present invention comprises additional embodiments, in which the functions may not be performed in a substantially simultaneous manner or in an opposite order depending on the functions involved, in the order shown or discussed. It is to be understood by those skilled in the art to which the embodiments of the present invention pertain.

It should be understood that portions of the present invention may be implemented in hardware, software, firmware or a combination thereof. In the above embodiments, a plurality of steps or methods may be implemented in software or firmware stored in a memory and executed by a suitable instruction executing system. For example, if implemented in hardware, as in another embodiment, it can be implemented by any one or the combination of the following techniques well known in the art: discrete logic circuits with logic gates for implementing logic functions on data signals, application specific integrated circuits with suitable combinational logic gates, programmable gate arrays (PGAs), field programmable gate arrays (FPGAs), etc.

One of ordinary skill in the art can understand that all or part of the steps carried by implementing the above method embodiments can be completed by a program to instruct related hardware, and the program can be stored in a computer readable storage medium. When the program is executed, one or the combination of the steps of the method embodiments is included.

In addition, each functional unit in each embodiment of the present invention may be integrated into one processing module, or each unit may exist physically separately, or two or more units may be integrated into one module. The above integrated modules can be implemented in the form of hardware or in the form of software functional modules. The integrated modules, if implemented in the form of software functional modules and sold or used as stand-alone products, may also be stored in a computer readable storage medium.

The above mentioned storage medium may be a read only memory, a magnetic disk or an optical disk or the like.

In the description of the present specification, the description with reference to the terms "one embodiment", "some embodiments", "example", "specific example", or "some examples" and the like means that specific features, structures, materials or features described in connection with the embodiment or example are included in at least one embodiment or example of the present invention. In the present specification, the schematic representation of the above terms does not necessarily mean the same embodiment or example. Furthermore, the specific features, structures, materials, or features described may be combined in a suitable manner in any one or more embodiments or examples.

Although the embodiments of the present invention have been shown and described, it is to be understood that the above embodiments are illustrative and are not to be construed as limiting the scope of the present invention. One of ordinary skill in the art can make changes, modifications, substitutions and variations to the above embodiments within the scope of the present invention.

What is claimed is:

1. An image enhancing method, comprising:
acquiring an image to be enhanced;
separating and extracting a luminance component and a chrominance component of the image to be enhanced;
extracting an illumination component from the luminance component;
performing luminance correction on the luminance component according to the illumination component to obtain a corrected luminance component;
synthesizing the corrected luminance component with the chrominance component to obtain an enhanced image;
wherein separating and extracting the luminance component and the chrominance component of the image to be enhanced comprises: determining whether the image to be enhanced belongs to a first target color space; wherein the first target color space is a color space comprising luminance;
if so, directly extracting the luminance component and the chrominance component of the image to be enhanced;
if not, converting the image to be enhanced into an image based on the first target color space and extracting the luminance component and the chrominance component.

2. The image enhancing method according to claim 1, wherein synthesizing the corrected luminance component with the chrominance component to obtain an enhanced image further comprises:
performing grayscale stretching on the corrected luminance component.

3. The image enhancing method according to claim 2, wherein performing grayscale stretching on the corrected luminance component comprises:
performing grayscale stretching on the corrected luminance component according to the following formula:

$$Y''(x, y) = \frac{1-A}{B-A} Y'(x, y) + \frac{(B-1)A}{B-A}$$

where A is the minimum gray level of the corrected luminance component Y'(x,y), B is the maximum gray level of the corrected luminance component Y'(x,y), and Y''(x,y) is the corrected luminance component after performing the grayscale stretching.

4. The image enhancing method according to claim 1, wherein the first target color space comprises: a YUV color space.

5. The image enhancing method according to claim 1, wherein extracting the illumination component from the luminance component comprises:
extracting the illumination component from the luminance component according to the following formula:

$$I(x,y)=Y(x,y)*G(x,y)$$

where Y(x,y) is the luminance component, G(x,y) is a filter function, and I(x,y) is the illumination component.

6. The image enhancing method according to claim 5, wherein performing luminance correction on the luminance component according to the illumination component to obtain a corrected luminance component comprises:
performing luminance correction on the luminance component according to the illumination component according to the following formula to obtain a corrected luminance component:

$$Y'(x, y) = Y(x, y)^{f_2[I(x,y)]}f_1[I(x,y)]$$

where $f_1[I(x,y)]$ and $f_2[I(x,y)]$ are functions of the illumination component I(x,y), and, Y'(x,y) is the corrected luminance component.

7. An image enhancing apparatus, comprising:
a processor and a memory connected to the processor;
wherein the memory is configured to store a computer program;
the processor is configured to invoke and execute the computer program in the memory to perform the steps of the method according to claim 1.

8. A non-transitory storage medium, wherein a computer program is stored in the storage medium, which, when executed by a processor, implements the steps of the method according to claim 1.

* * * * *